United States Patent
Haubold et al.

(10) Patent No.: US 11,620,208 B2
(45) Date of Patent: Apr. 4, 2023

(54) DEPLOYMENT OF VARIANTS BUILT FROM CODE

(71) Applicant: MICROSOFT TECHNOLOGY LICENSING, LLC, Redmond, WA (US)

(72) Inventors: Jeremy Haubold, Portage, IN (US); Rahul Nigam, Bothell, WA (US); Parminder Pal Singh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/352,079

(22) Filed: Jun. 18, 2021

(65) Prior Publication Data
US 2021/0397539 A1    Dec. 23, 2021

Related U.S. Application Data

(60) Provisional application No. 63/041,095, filed on Jun. 18, 2020.

(51) Int. Cl.
G06F 11/36    (2006.01)
(52) U.S. Cl.
CPC ........ G06F 11/3612 (2013.01); G06F 11/362 (2013.01)
(58) Field of Classification Search
CPC .................... G06F 11/362; G06F 11/3612
See application file for complete search history.

(56) References Cited

U.S. PATENT DOCUMENTS

| 8,365,140 | B2 | 1/2013 | Heyhoe et al. |
| 8,732,693 | B2 | 5/2014 | Mutisya et al. |
| 9,311,064 | B1 | 4/2016 | Whittington et al. |
| 10,423,406 | B2 | 9/2019 | Novak et al. |
| 10,474,559 | B2 | 11/2019 | Moorthi et al. |
| 2007/0006041 | A1* | 1/2007 | Brunswig ........... G06F 11/3688 |
|  |  |  | 714/38.14 |
| 2009/0235250 | A1* | 9/2009 | Takai ........................ G06F 8/60 |
|  |  |  | 718/1 |

(Continued)

OTHER PUBLICATIONS

"Generate and Deploy Multiple Flavor APKs in a Single Workflow", Retrieved from: https://devcenter.bitrise.io/deploy/android-deploy/generate-and-deploy-multiple-flavor-apks-in-a-single-workflow/, Retrieved Date: May 1, 2020, 4 Pages.

(Continued)

*Primary Examiner* — Wei Y Zhen
*Assistant Examiner* — Brahim Bourzik
(74) *Attorney, Agent, or Firm* — Newport IP, LLC; Han Gim

(57) ABSTRACT

Systems and methods are described for verifying functionality of software. A set of code that is to be validated is identified. A first configuration is determined for the set of code that configures the code as a first build for validation. The first build is released for a first validation process. Prior to completion of validation of the first build, a second configuration is determined for the set of code that configures the code as a second build for validation. The second build is released for a second validation process prior to completion of validation of the first build. The first and second validation process are staged so that the first and second builds can be reverted independently of one another in the event of a validation issue. The first and second validation process are independently completed in the absence of a validation issue.

20 Claims, 8 Drawing Sheets

(56) References Cited

U.S. PATENT DOCUMENTS

| | | | |
|---|---|---|---|
| 2013/0036328 A1* | 2/2013 | Mutisya | G06F 8/65 717/172 |
| 2013/0036402 A1 | 2/2013 | Mutisya et al. | |
| 2014/0282353 A1 | 9/2014 | Jubran et al. | |
| 2014/0282421 A1 | 9/2014 | Jubran et al. | |
| 2017/0124487 A1 | 5/2017 | Szeto et al. | |
| 2017/0180266 A1* | 6/2017 | Frank | H04L 67/51 |
| 2017/0286080 A1 | 10/2017 | Krishnamoorthy et al. | |
| 2019/0235896 A1* | 8/2019 | Semmandampalayam | H04L 67/1001 |
| 2019/0294528 A1 | 9/2019 | Avisror et al. | |

OTHER PUBLICATIONS

"Understanding Variant Selection", Retrieved from: https://web.archive.org/web/20200221052300/https:/docs.gradle.org/current/userguide/variant_model.html, Feb. 21, 2020, 24 Pages.

Jacobs, et al., "Explore How to Progressively Expose your Azure DevOps Extension Releases in Production to Validate, Before Impacting all Users", Retrieved from: https://docs.microsoft.com/en-us/azure/devops/migrate/phase-rollout-with-rings?view=azure-devops, Apr. 26, 2018, 13 Pages.

Karababa, Firat, "Android Build Variants", Retrieved from: https://android.jlelse.eu/android-build-variants-6880a07abf0, Dec. 2, 2017, 15 Pages.

Ogbo, Obaro, "Building Multiple Flavors of an Android App", Retrieved from: https://www.androidauthority.com/building-multiple-flavors-android-app-706436/, Aug. 4, 2016, 12 Pages.

Sato, Danilo, "CanaryRelease", Retrieved from: https://martinfowler.com/bliki/CanaryRelease.html, Jun. 25, 2014, 6 Pages.

"International Search Report and Written Opinion Issued in PCT Application No. PCT/US21/038127", dated Oct. 12, 2021, 13 Pages.

\* cited by examiner

FIG. 2

| EDOG Farm 1 | | | | | PROD Ring 1 | | | | | PROD Ring 2 | | | | |
|---|---|---|---|---|---|---|---|---|---|---|---|---|---|---|
| - | - | - | - | | - | - | - | - | | - | - | - | - | |
| B | - | - | - | | - | - | - | - | | - | - | - | - | First GU with B |
| B | B | - | - | | - | - | - | - | | - | - | - | - | |
| B | B | B | B | | - | - | - | - | | - | - | - | - | |
| B | B | B | B | | B | - | - | - | | - | - | - | - | |
| B | B | B | B | | B | B | - | - | | - | - | - | - | |
| B | B | B | B | | B | B | B | B | | - | - | - | - | |
| B | B | B | B | | B | B | B | B | | B | - | - | - | |
| B | B | B | B | | B | B | B | B | | B | B | - | - | |
| B | B | B | B | | B | B | B | B | | B | B | B | B | B finishes |
| C | B | B | B | | B | B | B | B | | B | B | B | B | First GU with C |
| C | C | B | B | | B | B | B | B | | B | B | B | B | |
| C | C | C | C | | B | B | B | B | | B | B | B | B | |
| C | C | C | C | | C | B | B | B | | B | B | B | B | |
| C | C | C | C | | C | C | B | B | | B | B | B | B | |
| C | C | C | C | | C | C | C | C | | C | B | B | B | |
| C | C | C | C | | C | C | C | C | | C | C | B | B | |
| C | C | C | C | | C | C | C | C | | C | C | C | C | C finishes |

FIG. 3

EDOG Farm 1

| | | | |
|---|---|---|---|
| - | - | - | - |
| B | - | - | - |
| B | B | - | - |
| B | B | B | B |
| B | B | B | B |
| CB | B | B | B |
| CB | CB | B | B |
| CB | CB | CB | CB |
| DCB | CB | CB | CB |
| DCB | DCB | CB | CB |
| DC | DC | DC | DC |
| DC | DC | DC | DC |
| DC | DC | DC | DC |
| DC | DC | DC | DC |
| DC | DC | DC | DC |
| DC | DC | DC | DC |
| EDC | CD | CD | CD |
| EDC | EDC | CD | CD |
| EDC | EDC | EDC | EDC |
| EC | EC | EC | EC |
| EC | EC | EC | EC |
| EC | EC | EC | EC |
| E | E | E | E |
| E | E | E | E |
| E | E | E | E |
| E | E | E | E |
| - | - | - | - |

PROD Ring 1

| | | | |
|---|---|---|---|
| - | - | - | - |
| - | - | - | - |
| - | - | - | - |
| - | - | - | - |
| B | - | - | - |
| B | B | - | - |
| B | B | B | B |
| B | B | B | B |
| CB | B | B | B |
| CB | CB | B | B |
| C | C | C | C |
| C | C | C | C |
| DC | C | C | C |
| DC | DC | C | C |
| DC | DC | DC | DC |
| DC | DC | DC | DC |
| CD | CD | CD | CD |
| CD | CD | DC | DC |
| DC | DC | DC | DC |
| EC | C | C | C |
| EC | EC | C | C |
| EC | EC | EC | EC |
| E | E | E | E |
| E | E | E | E |
| E | E | E | E |
| E | E | E | E |
| - | - | - | - |

PROD Ring 2

| | | | |
|---|---|---|---|
| - | - | - | - | 401
| - | - | - | - |
| - | - | - | - |
| - | - | - | - | 402
| - | - | - | - | 403
| - | - | - | - |
| - | - | - | - |
| - | - | - | - | 404
| B | - | - | - |
| B | B | - | - |
| B | B | B | B |
| - | - | - | - |
| - | - | - | - |
| C | - | - | - |
| C | C | - | - | 405
| C | C | - | - | 406
| - | - | - | - | 407
| D | - | - | - | 408
| D | D | - | - | 409
| D | D | D | D |
| C | - | - | - |
| C | C | - | - | 410
| C | C | C | C |
| - | - | - | - |
| E | - | - | - |
| E | E | - | - | 411
| E | E | E | E |
| - | - | - | - |

FIG. 4

DEPLOYMENT OF VARIANTS BUILT FROM CODE

PRIORITY APPLICATION

This application claims the benefit of and priority to U.S. Provisional Application No. 63/041,095, filed Jun. 18, 2020, and entitled "DEPLOYMENT OF VARIANTS BUILT FROM CODE", the entire contents of which are incorporated herein by reference.

BACKGROUND

Software is complex and can include a vast number of settings and inputs, dramatically increasing the scope of potential parameters, test interfaces, and performance metrics. Due to this complexity, the number and pace of broad changes that can be rolled out and validated can be limited due to the significant level of testing required. Additionally, limitations in rollback schemes further limit the number and pace of changes. It is with respect to these considerations and others that the disclosure made herein is presented.

SUMMARY

Many developers need to be able to deploy product-wide changes, including but not limited to large code refactors, framework upgrades, and compiler upgrades, for example. Individual teams may develop a plan to rollout changes in a way that is safe as well as meet their overall delivery timelines, but the list of such changes may grow at a rate faster than can be validated and deployed using current approaches. Furthermore, broad changes are not amenable to being placed behind a kill switch due to the broad scope of the configuration and variable changes. The present disclosure provides a way to rollout such changes and to allow rapid recovery in case of failure for multiple code variants. Various embodiments are disclosed for providing automated validation via telemetry deviation, automated rollback in the event of an incident, and enable further deployment in the event that the change is to proceed. Furthermore, the described embodiments allow for the multiple simultaneous variants.

The described embodiments may allow for a committed set of code to be built in multiple ways, thus allowing for testing of different aspects of the code. Each build may have different outputs and thus data can be collected from the baseline build as well as the modified builds to allow for comparison and to detect issues. In this way, the described embodiments may allow for a developer to safely create and batch rollouts in a limited fashion and synchronize and generate releases for the same committed software, enabling the rollout of multiple infrastructure changes.

The described embodiments can allow developers to save a considerable amount of time and effort and unnecessary consumption of computing resources. Various users and testers can analyze various sets of data of interest, such as duration and reliability. The data may be aggregated by the baseline and each variant so that analysts can readily observe the deltas and quantify the impact of each variant.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

FIG. 2 is a diagram illustrating an example process in accordance with the present disclosure;

FIG. 3 is a diagram illustrating an example process in accordance with the present disclosure;

FIG. 4 is a diagram illustrating an example process in accordance with the present disclosure;

DETAILED DESCRIPTION

Development and verification of software builds can be extremely complex. Exhaustively executing tests that encompass all configurations that are possible for a build is difficult and is typically time prohibitive using current methods. The inability to efficiently test multiple builds may result in slow release of features, leading to customer dissatisfaction.

The present disclosure describes ways to test and deliver multiple build variants (from the same committed software) in parallel to the production system. The disclosed embodiments can enable development teams to safely control the rollout timing for builds while allowing for testing of the changes. The disclosed technologies may be implemented to deploy product-wide changes, including but not limited to: large code refactors, framework upgrades (e.g., Microsoft .NET), and compiler upgrades. By testing and delivering multiple build variants, multiple development teams can rollout changes in a way that is safe as well as meet their overall delivery timelines, in a way that addresses the challenges of validating and deploying multiple builds simultaneously. Furthermore, the changes can be rolled out while allowing for rapid recovery in case of failure.

In an embodiment, a system may be implemented that provides an interface for developers to initiate a new build deployment using entry of selected commands and an identifier. The system may generate a mapping of identifiers and associated builds which are to be deployed. The system may also access and apply a rollout policy.

The rollout may be distributed into multiple stages. The rollout may further be rolled out over a period of time that may be determined by applied policies. In one embodiment, when a stage is to be initiated, metadata associated with a Release Vehicle Identifier, Farmlabel, Percentage of VMs, and Delivery type (package by default), may be stored in a datastore in an asynchronous manner.

In some embodiments, a fast and a slow policy may also be implemented. Based on Deliverytype, changes may be deployed on different farms at different stages. The owners of a build may be provided the permissions and ability to suspend rollout, resume rollout, and move to the next rollout stage.

Figure 1A:
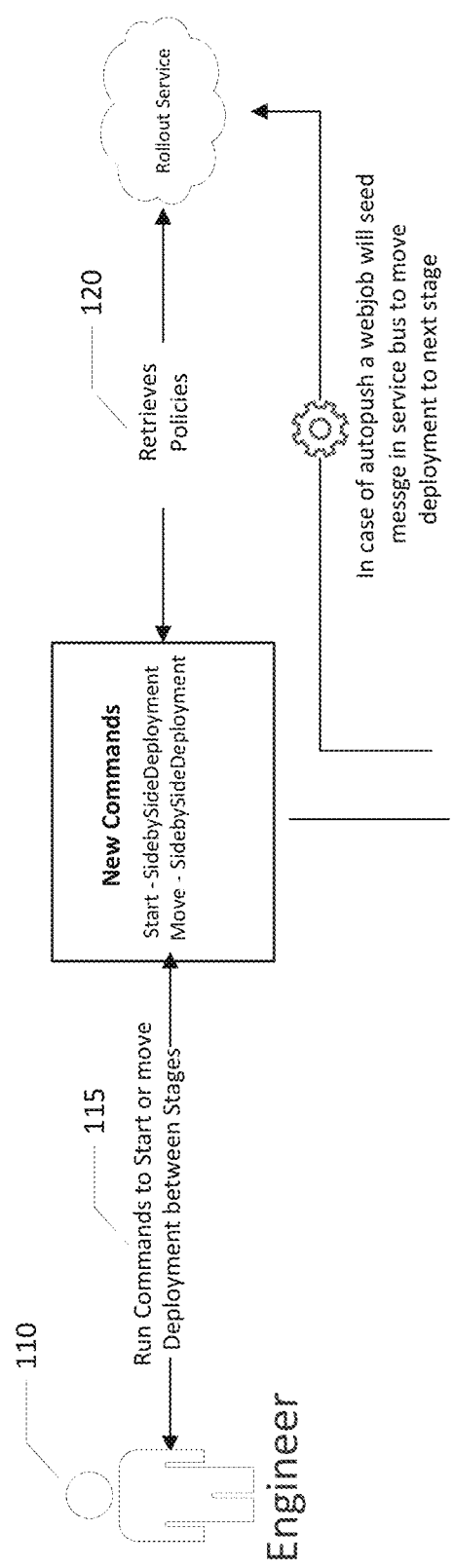
FIG. 1A is a diagram illustrating an example process in accordance with the present disclosure.
Figure 1B:
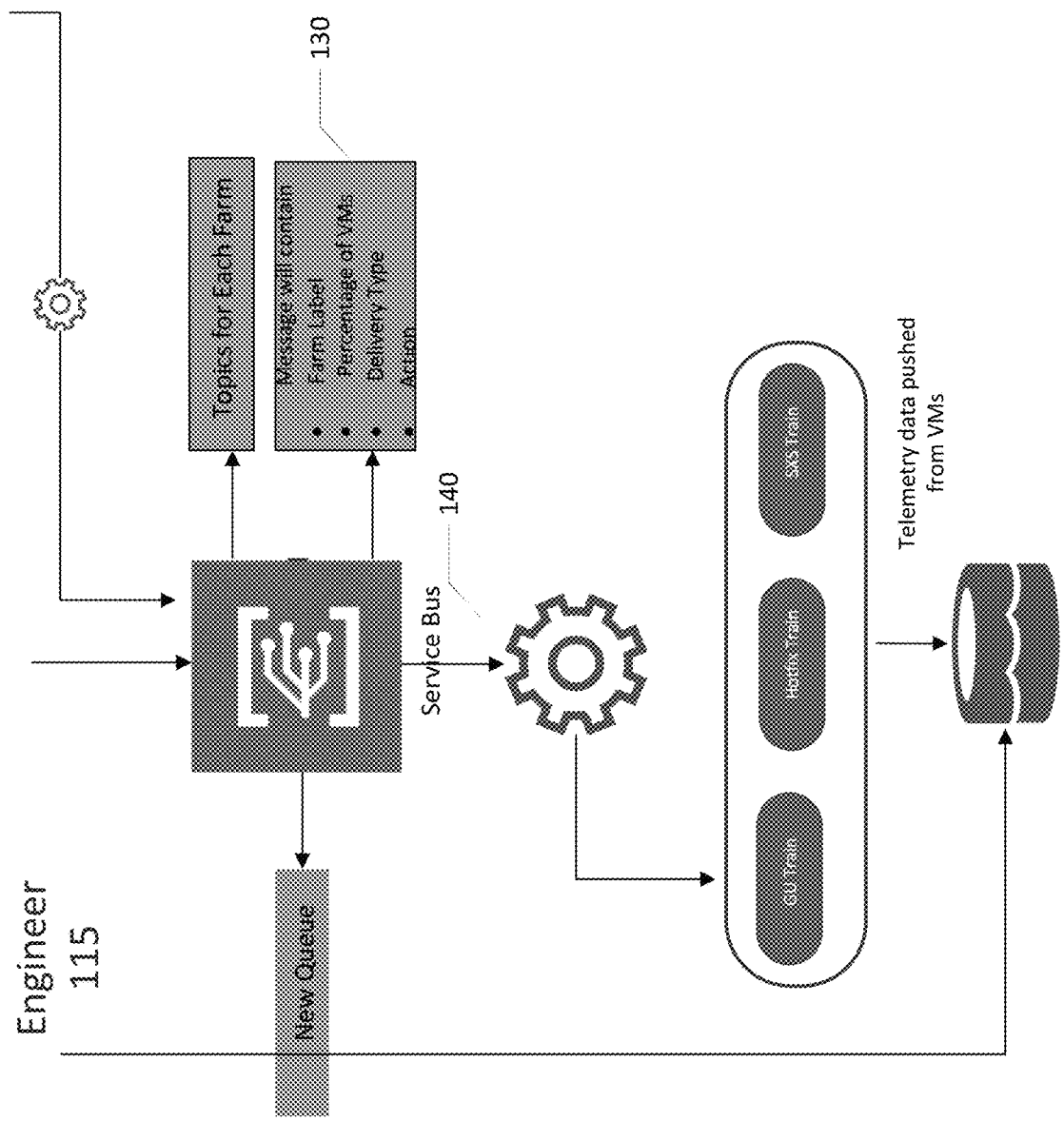
FIG. 1B is a diagram illustrating an example process in accordance with the present disclosure.

FIG. 1A and FIG. 1B illustrate example aspects of the described embodiments.

As shown in FIG. 1A, an engineer 110 may initiate 115 a new SideVar deployment using new commands and an identifier. In an embodiment, mapping of the identifier and the build which will need be deployed may be stored. When a new SideVar request is created, a default rollout policy 120 may be stored in a datastore. The rollout may be distributed into stages (e.g., 36). Once a stage is moved, metadata related to train identifier, farmlabel, percentage of VMs, and delivery type 130 (package by default), may be stored in a datastore in an asynchronous manner leveraging service bus 140. In some embodiments, in additional to a default policy, a fast and a slow policy may also be available. Changes based on delivery type may be deployed on different farms at different stages. Teams and owners may be provided the ability to suspend rollout, resume rollout, and move to next rollout stage. The following table may be referred to in FIG. 1A:

| Farm/VM | EDOG/SPDF (Phase 1) | MSIT/US_17 (Phase 2) | 1% Prod (Phase 3) | 29% Prod (Phase 4) | 30% Prod (Phase 5) | 40% Prod (Phase 6) |
| --- | --- | --- | --- | --- | --- | --- |
| Stage 1 | 5% | 5% | 5% | 5% | 5% | 5% |
| Stage 2 | 10% | 10% | 10% | 10% | 10% | 10% |
| Stage 3 | 25% | 25% | 25% | 25% | 25% | 25% |
| Stage 4 | 50% | 50% | 50% | 50% | 50% | 50% |
| Stage 5 | 75% | 75% | 75% | 75% | 75% | 75% |
| Stage 6 | 100% | 100% | 100% | 100% | 100% | 100% |

In an embodiment, a first release vehicle may increase the percentage of virtual machines that have one particular variant. When this occurs, a function may calculate the new percentage of virtual machines to receive this update and then trigger an update on these virtual machines.

Code regression may also be accommodated. In case of a regression, a workflow may be triggered and rollout of all variants may be stopped. In the event that the regression is found to be a bug, a fix may be triggered for all variants to resume the release vehicle.

A variant framework may include one or more build-time variables.

All builds generated from the same commit may have the same version number, although potentially different behaviors due to the build-time variables comprising different variations.

Details of the build time specific variations enabled on a build may be stamped in a file in the build artifact, in a specified folder. The contents of this file may be human readable and may be a single string that uniquely identifies a variation.

A variation build variable may be used to dynamically include/exclude source files being moved, set other variables, or used however necessary to make the appropriate behavior change in the build. Some examples may include a variable for:
Moving source files to another assembly:
Add filebeingmoved.cs to sources if the release vehicle is enabled
and
Add filebeingmoved.cs to sources if the release vehicle is NOT enabled
Enabling a build flag
Add/mycustomflag if the release vehicle is enabled
Using a different version of a package (dependency)
Use Foo version 1.2 if the release vehicle is enabled While validation may be tracked per version, in embodiments validation may be tracked per tag where each variant can be validated. Validation may also be tracked based on dependencies and other factors.

Due to load and resource constraints and test reliability, it may not be possible to test all release vehicles equally at specified times. By assuming that for the majority of variations, a failure will likely be significant, the validation required for a variation may be restricted. For example, for a given build, there may be a baseline release vehicle, with full validation across build and test, and zero or more variations, with restricted build and test. On the build side, instead of building multiple flavors, only one build may be implemented (e.g., debug x64). Instead of running all validation policies, a subset may be run.

In order for a particular variation to proceed beyond alpha, its corresponding validation run must be as reliable as the baseline validation. Once the release vehicle has been chosen to proceed to beta, full PR validation for that release vehicle may be enabled (doubling the number of running policies). The validation run for the release vehicle may be used as a proxy for the policy having been in place at PR time.

Once the beta is complete (e.g., 100% in PROD), after the build variables are promoted to the baseline, the PR policies may be removed as part of release vehicle graduation.

Running variations in parallel will allow for higher throughput, but could also enable situations where:
Simultaneous release vehicles are fundamentally incompatible with each other
Individual release vehicle conductors are unaware of other simultaneous release vehicles and attempt to deploy to a percentage of VMs in a farm that results in a critically low quantity of machines with a "known good" build.
Individual release vehicle conductors are aware of other simultaneous release vehicles but are unable to deploy further because it would result in a critically low quantity of machines with a "known good" build.

In order to mitigate these situations, the following may be implemented:
Set aside a small percentage of PROD rings (~10%) that may be used equally by all active variations. Let M be the highest that any release vehicle may go, of the 10%. A release vehicle using part of this portion of machines may be said to be in alpha-multiple variants in production at the same time; validate all across all customers.
All variations may use independent sets of build variables
Individual release vehicles may roll out progressively through PROD rings, up to M %
Periodically, a process may be implemented to determine which of the active alpha release vehicles should proceed to the next stage (full rollout). This next stage is beta.

A release vehicle in beta (roll out—other variants to zero percent) may proceed ring by ring, rolling out gradually to 100% before proceeding to the next ring.

Note that when a variation is elected for beta, a specific build/version/commit is chosen as the cutover point, in order to prevent earlier (and possibly unreliable) versions of that release vehicle from being deployed.

beta is a deployment that follows the ring+stops outlined above, with a delay between stops, in order to ensure that under load, telemetry provides a positive signal.

As this beta rollout proceeds through each deployment ring, all other active variation flights are rolled sideways to 0%. This eliminates the risk of having machines in PROD with an untested configuration.

After beta rollout completes 100% in PROD, the build variables on this variation are promoted to all other build queues, and that release vehicle is removed, having been graduated.

Figure 2:
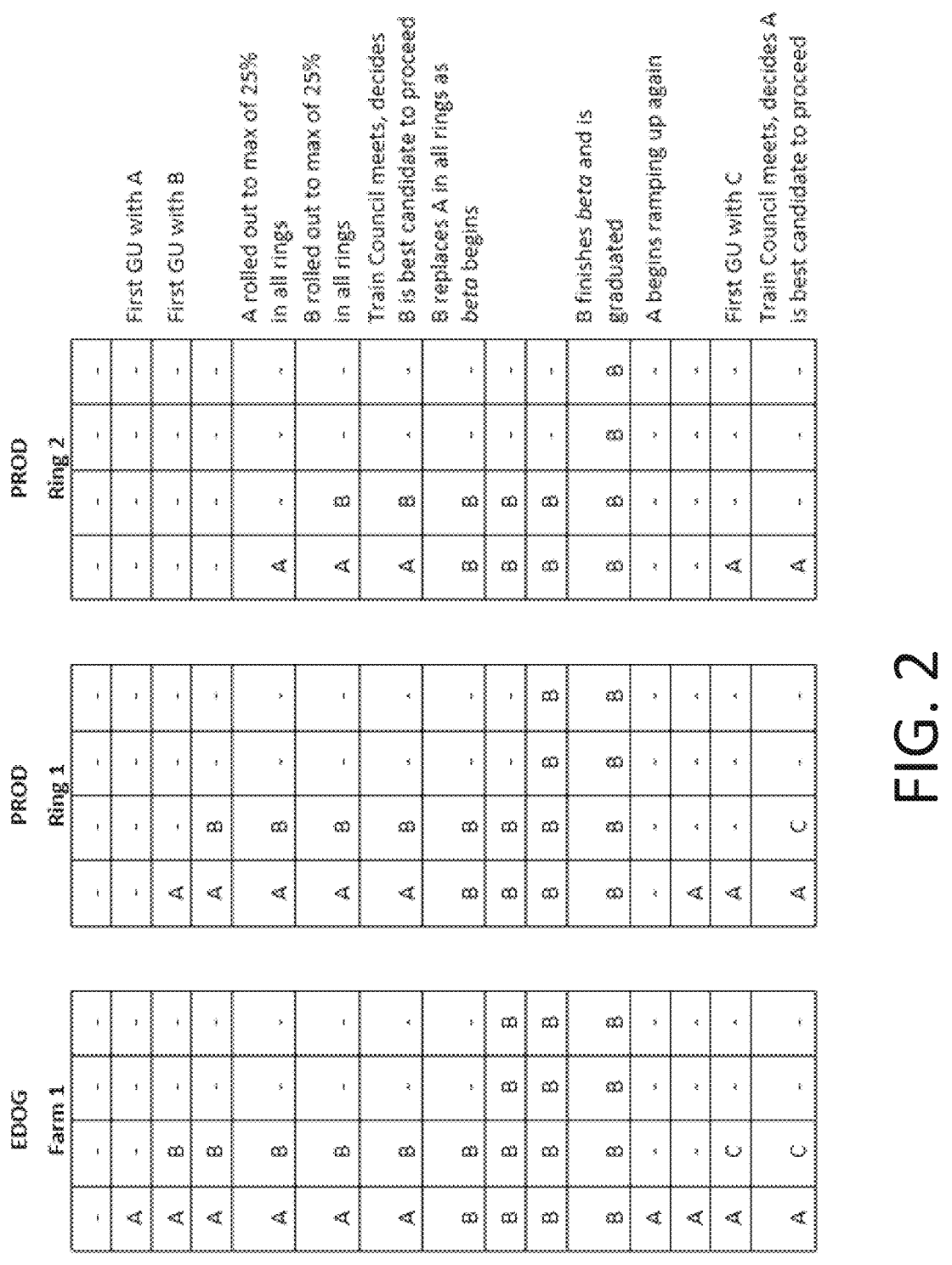

FIG. 2 illustrates an example of the process outlined above. In this example, alpha variations are allowed to take 50% total. The vertical axis is in ascending chronological order; the horizontal access represents multiple rings and portions of each ring (corresponding to the notion of release vehicle stops).

The number of release vehicles that can be implemented may be limited if run in a sequential manner. It may be desirable to increase the quantity of changes that can be validated as some changes will span several release vehicles.

FIG. 3 illustrates one example for how a multi-variant deployment may be implemented with variations B and C.

In some embodiments, pipelining allows for multiple parallel release vehicles, where release vehicle N contains all changes from release vehicles M through N−1, where M is the oldest active release vehicle.

In some embodiments, the following pipelining guidelines may be implemented:

No release vehicle may overtake an earlier release vehicle except in predetermined circumstances (outlined below)

Within any rollout ring, there may be only one release vehicle active.

By using this approach significantly higher throughput may be realized.

Release vehicles may be defined as the union of one or more build flags. The general case is that release vehicles will correspond 1:1 with build flags, although there may be exceptions.

Each release vehicle N may contain its own build flag, as well as the build flags from all prior release vehicles currently in progress. If release vehicle N is halted due to an issue that prevents it from rolling out further, but also does not require a global roll 'sideways' (e.g., a performance issue that affects one group but not another), release vehicle N+1 may be allowed to overtake release vehicle N. In an embodiment, this can be implemented as follows:

Release vehicle N is rolled sideways to 0% within its current ring.

Release vehicle N+1 reaches 100% in the last ring in which Release vehicle N is fully deployed, giving the two deployment parity. However, at this stage, Release vehicle N technically has zero machines deployed. Therefore it is safe to:

Switch Release vehicle N flags to just those in delta between Release vehicle N and Release vehicle N+1 (see example below)

This order of operations technically does not make Release vehicle N+1 overtake Release vehicle N. Instead, it changes the definition of Release vehicle N.

FIG. 4 illustrates an example timeline describing how a release vehicle overtake is implemented. 401 illustrates the first GU with B. 402 illustrates the first GU with B in PROD. 403 illustrates the first GU with C (which is C+B). 404 illustrates the first GU with D (which is D+C+B). Also, the last GU with B, build switches globally enabled, subsequently making D=(D+C), and C=(C). 405 illustrates an issue with train C notice, C is put on hold. 406 illustrates C is rolled back from Ring 2, giving D parity with C. 407 illustrates that C is redefined as (C+D), and D is redefined as (D). Also, the first GU with E (E+D+C+B). 408 illustrates C is released from hold, but because D is rolling out, C may not yet proceed. 409 illustrates the last GU with D, build switches globally enable, subsequently making E=(E+C) and C=(C), also unblocking C. 410 illustrates the last GU with C, build switches globally enabled, subsequently making E=€. 411 illustrates the last GU with E, with everything back to baseline.

Figure 5:
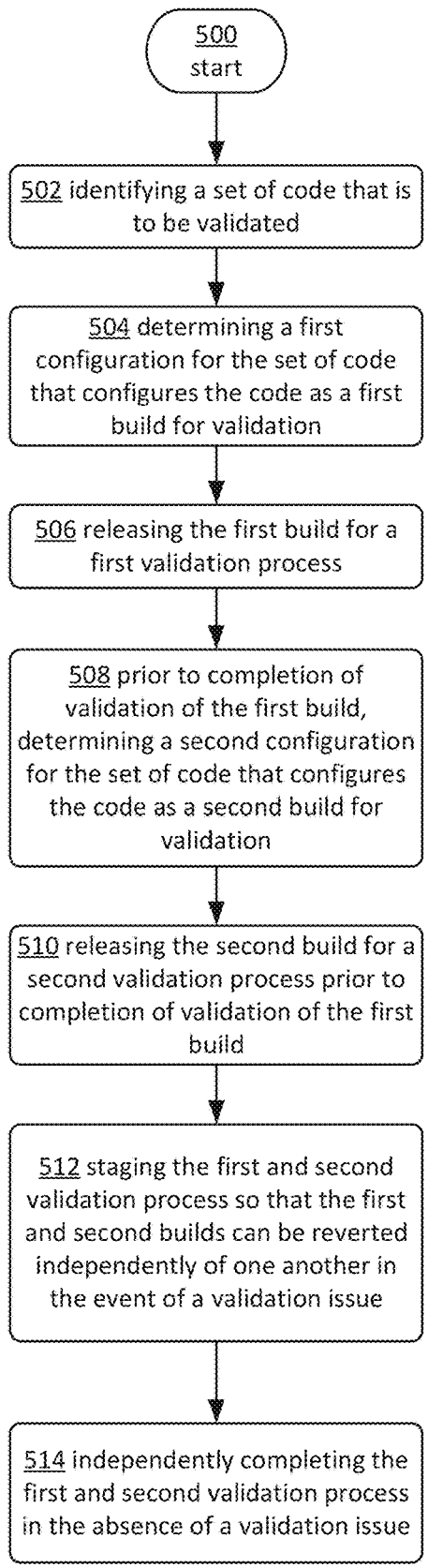
FIG. 5 is a flowchart depicting an example procedure in accordance with the present disclosure.

FIG. 5 illustrates an example operational procedure for verifying functionality of a computing device. In an embodiment, the procedure can be implemented at least in part in a system or function on a computing device corresponding to FIGS. 6 and 7.

Referring to FIG. 5, operation 500 begins the operational procedure. Operation 500 may be followed by operation 502. Operation 502 illustrates identifying a set of code that is to be validated. Operation 502 may be followed by operation 504. Operation 504 illustrates determining a first configuration for the set of code that configures the code as a first build for validation. Operation 504 may be followed by operation 506. Operation 506 illustrates releasing the first build for a first validation process.

Operation 506 may be followed by operation 508. Operation 508 illustrates prior to completion of validation of the first build, determining a second configuration for the set of code that configures the code as a second build for validation.

Operation 508 may be followed by operation 510. Operation 510 illustrates releasing the second build for a second validation process prior to completion of validation of the first build.

Operation 510 may be followed by operation 512. Operation 512 illustrates staging the first and second validation process so that the first and second builds can be reverted independently of one another in the event of a validation issue.

Operation 512 may be followed by operation 514. Operation 514 illustrates independently completing the first and second validation process in the absence of a validation issue.

Figure 6:
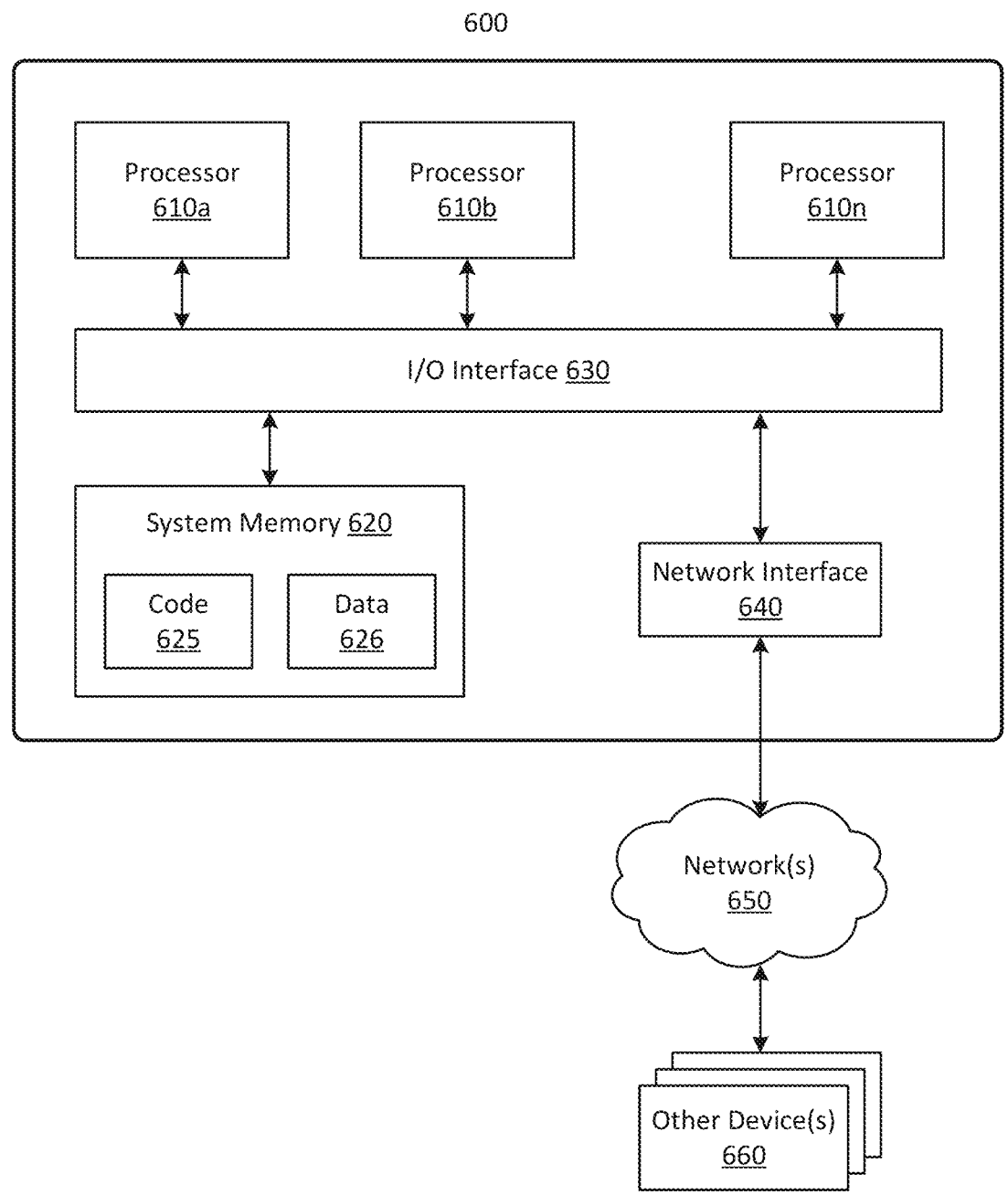
FIG. 6 is an example computer system that may be used in some embodiments.

In at least some embodiments, a computing device that implements a portion or all of one or more of the technologies described herein, including the techniques to implement multiple variants may include a general-purpose computer system that includes or is configured to access one or more computer-accessible media. FIG. 6 illustrates such a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 650, such as other computer systems or devices as illustrated in FIGS. 1 through 11, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a 5 computer-accessible medium configured to store program instructions and data as described above for FIGS. 1-5 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A network set up by an entity, such as a company or manufacturer, to provide one or more services (such as various types of cloud-based analytics services) accessible via the Internet and/or other networks to a distributed set of clients may be termed a service provider. Such a provider network may include numerous data centers hosting various resource pools, such as collections of physical and/or virtualized computer servers, storage devices, networking equipment, and the like, needed to implement and distribute the infrastructure and services offered by the service provider.

Figure 7:
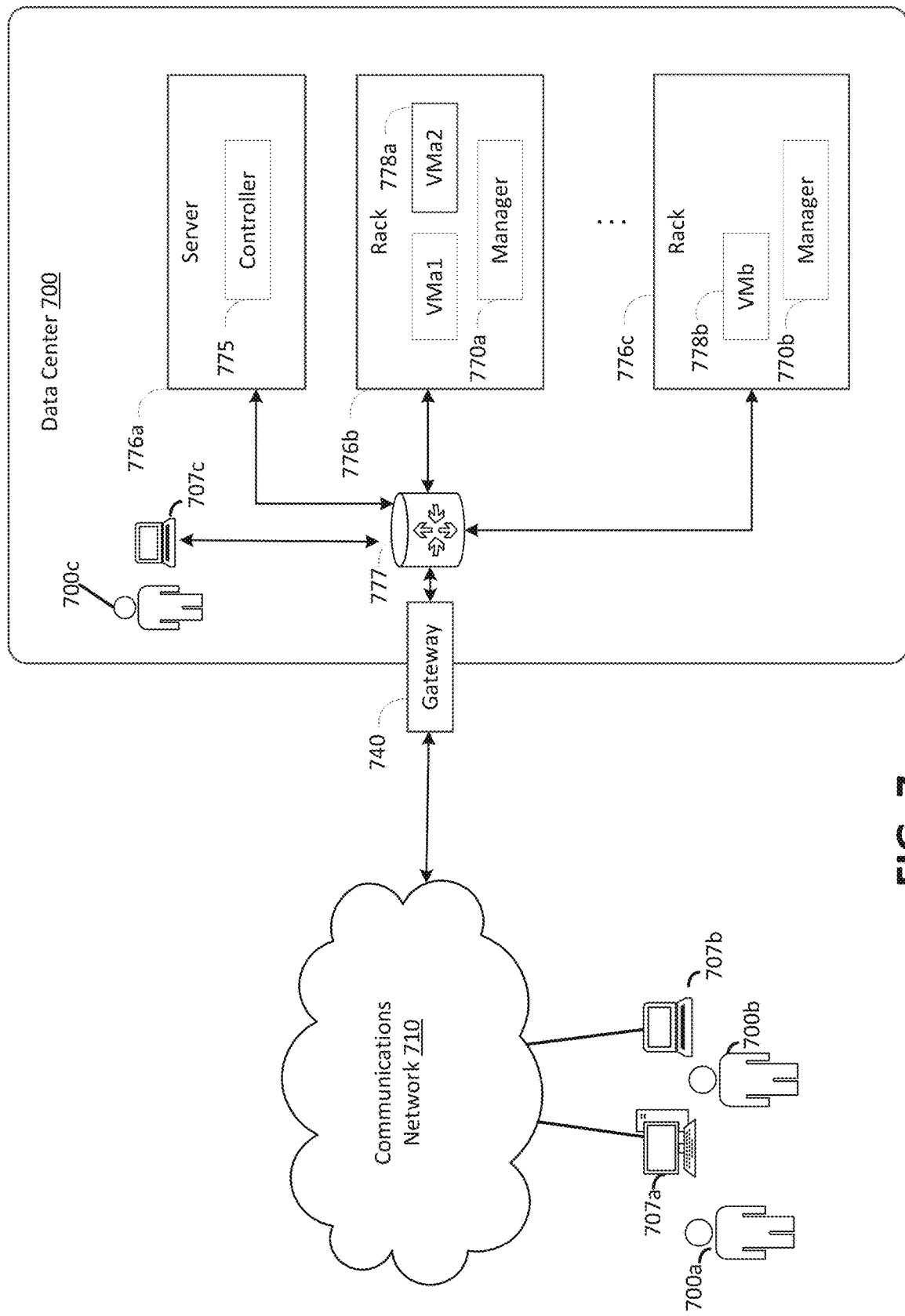
FIG. 7 is a diagram illustrating a data center where some aspects of the disclosure may be implemented, in accordance with the present disclosure.

FIG. 7 illustrates an example computing environment in which the embodiments described herein may be implemented. FIG. 7 illustrates a data center 700 that is configured to provide computing resources to users 700*a*, 700*b*, or 700*c* (which may be referred herein singularly as "a user 700" or in the plural as "the users 700") via user computers 707*a*, 707*b*, and 707*c* (which may be referred herein singularly as "a computer 707" or in the plural as "the computers 707") via a communications network 710. The computing resources provided by the data center 700 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 700 may correspond to service provider 100 in FIGS. 1 and 2, or edge site 150 of FIG. 2. Data center 700 may include servers 776a, 776b, and 776c (which may be referred to herein singularly as "a server 776" or in the plural as "the servers 776") that may be standalone or installed in server racks, and provide computing resources available as virtual machines 778a and 778b (which may be referred to herein singularly as "a virtual machine 778" or in the plural as "the virtual machines 778"). The virtual machines 778 may be configured to execute applications such as Web servers, application servers, media servers, database servers, and the like. Other resources that may be provided include data storage resources (not shown on FIG. 7) and may include file storage devices, block storage devices, and the like. Servers 776 may also execute functions that manage and control allocation of resources in the data center, such as a controller 775. Controller 775 may be a fabric controller or another type of program configured to manage the allocation of virtual machines on servers 776.

Referring to FIG. 7, communications network 710 may, for example, be a publicly accessible network of linked networks and may be operated by various entities, such as the Internet. In other embodiments, communications network 710 may be a private network, such as a corporate network that is wholly or partially inaccessible to the public.

Communications network 710 may provide access to computers 707. Computers 707 may be computers utilized by users 700. Computer 707a, 707b or 707c may be a server, a desktop or laptop personal computer, a tablet computer, a smartphone, a set-top box, or any other computing device capable of accessing data center 700. User computer 707a or 707b may connect directly to the Internet (e.g., via a cable modem). User computer 707c may be internal to the data center 700 and may connect directly to the resources in the data center 700 via internal networks. Although only three user computers 707a, 707b, and 707c are depicted, it should be appreciated that there may be multiple user computers.

Computers 707 may also be utilized to configure aspects of the computing resources provided by data center 700. For example, data center 700 may provide a Web interface through which aspects of its operation may be configured through the use of a Web browser application program executing on user computer 707. Alternatively, a stand-alone application program executing on user computer 707 may be used to access an application programming interface (API) exposed by data center 700 for performing the configuration operations.

Servers 776 may be configured to provide the computing resources described above. One or more of the servers 776 may be configured to execute a manager 770a or 770b (which may be referred herein singularly as "a manager 770" or in the plural as "the managers 770") configured to execute the virtual machines. The managers 770 may be a virtual machine monitor (VMM), fabric controller, or another type of program configured to enable the execution of virtual machines 778 on servers 776, for example.

It should be appreciated that although the embodiments disclosed above are discussed in the context of virtual machines, other types of implementations can be utilized with the concepts and technologies disclosed herein.

In the example data center 700 shown in FIG. 7, a network device 777 may be utilized to interconnect the servers 776a and 776b. Network device 777 may comprise one or more switches, routers, or other network devices. Network device 777 may also be connected to gateway 740, which is connected to communications network 710. Network device 777 may facilitate communications within networks in data center 700, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 700 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

A number of different types of computing devices may be used singly or in combination to implement the resources of the service provider in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

As used herein, the phrase "configured to" may encompass any way that any kind of structural component can be constructed to perform an identified operation. The structural component can be configured to perform an operation using software, hardware, firmware and the like, or any combinations thereof. The term "logic" may encompass any functionality for performing a task. For instance, each operation illustrated in the flowcharts corresponds to logic for performing that operation. An operation can be performed using software, hardware, firmware, physical electronic circuits, and the like, or any combinations thereof. The terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A computer-implemented method for verifying functionality of software, the method comprising:
identifying a set of code that is to be validated;
determining a first configuration for the set of code that configures the code as a first build for validation;
releasing the first build for a first validation process;
prior to completion of validation of the first build, determining a second configuration for the set of code that configures the code as a second build for validation;
releasing the second build for a second validation process prior to completion of validation of the first build;
staging the first and second validation process so that the first and second builds can be reverted independently of one another in response to a validation issue; and
independently completing the first and second validation process in the absence of a validation issue.

Clause 2: The method of clause 1, wherein the first and second builds are validated on a plurality of virtual machines, the method further comprising releasing the first and second builds to respective percentages of the virtual machines.

Clause 3: The method of any of clauses 1-2, further comprising releasing the first and second builds in multiple stages.

Clause 4: The method of any of clauses 1-3, wherein the first and second builds use independent sets of build variables.

Clause 5: The method of any of clauses 1-4, wherein the first and second builds are validated on a plurality of virtual machines and the first and second builds are released in multiple stages, the method further comprising providing options to suspend rollout, resume rollout, and move to a next rollout stage.

Clause 6: The method of any of clauses 1-5, wherein the first and second builds are validated on a plurality of virtual machines and the first and second builds are released in multiple stages, wherein a first release vehicle increase a percentage of virtual machines that have one particular variant.

Clause 7: The method of clauses 1-6, further comprising:
in response to a regression, triggering a workflow and stopping rollout of all variants may be stopped.

Clause 8: The method of any of clauses 1-7, further comprising in response to determining that the regression is a bug, triggering a fix for all variants to resume a release vehicle for the builds.

Clause 9: A system comprising:
one or more processors; and
a memory in communication with the one or more processors, the memory having computer-readable instructions stored thereupon that, when executed by the one or more processors, cause the system to perform operations comprising:
identifying a set of code that is to be validated;
determining a first configuration for the set of code that configures the code as a first build for validation;
releasing the first build for a first validation process;
prior to completion of validation of the first build, determining a second configuration for the set of code that configures the code as a second build for validation;
releasing the second build for a second validation process prior to completion of validation of the first build;
staging the first and second validation process so that the first and second builds can be reverted independently of one another in response to a validation issue; and
independently completing the first and second validation process in the absence of a validation issue.

Clause 10: The system of clause 9, further comprising executing a variant framework that includes one or more build-time variables.

Clause 11: The system of any of clauses 9 and 10, further comprising reserving a percentage of production rings for use by all active variations.

Clause 12: The system of any clauses 9-11, further comprising pipelining to allow for parallel release vehicles.

Clause 13: The system of any clauses 9-12, wherein the first and second builds are validated on a plurality of virtual machines, further comprising releasing the first and second builds to respective percentages of the virtual machines.

Clause 14: The system of any clauses 9-13, further comprising releasing the first and second builds in multiple stages.

Clause 15: The system of any clauses 9-14, wherein the first and second builds use independent sets of build variables.

Clause 16: The system of any clauses 9-15, wherein the first and second builds are validated on a plurality of virtual machines and the first and second builds are released in multiple stages, further comprising providing options to suspend rollout, resume rollout, and move to a next rollout stage.

Clause 17: A computer-readable storage medium having computer-executable instructions stored thereupon which, when executed by one or more processors of a system, cause the system to:
identifying a set of code that is to be validated;
determining a first configuration for the set of code that configures the code as a first build for validation;
releasing the first build for a first validation process;
prior to completion of validation of the first build, determining a second configuration for the set of code that configures the code as a second build for validation;
releasing the second build for a second validation process prior to completion of validation of the first build;
staging the first and second validation process so that the first and second builds can be reverted independently of one another in response to a validation issue; and
independently completing the first and second validation process in the absence of a validation issue.

Clause 18: The computer-readable storage medium of clause 17, wherein the first and second builds are validated on a plurality of virtual machines, further comprising releasing the first and second builds to respective percentages of the virtual machines.

Clause 19: The computer-readable storage medium of any of clauses 17 and 18, wherein the first and second builds are validated on a plurality of virtual machines and the first and second builds are released in multiple stages, further comprising providing options to suspend rollout, resume rollout, and move to a next rollout stage.

Clause 20: The computer-readable storage medium of any of the clauses 17-19, wherein the first and second builds are validated on a plurality of virtual machines and the first and second builds are released in multiple stages, wherein a first release vehicle increase a percentage of virtual machines that have one particular variant.

What is claimed is:

1. A computer-implemented method for verifying functionality of software, the method comprising:
   identifying a set of code that is to be validated;
   determining a first configuration for the set of code that configures the code as a first build for validation;
   releasing the first build for a first validation process;
   prior to completion of validation of the first build, determining a second configuration for the set of code that configures the code as a second build for validation;
   releasing the second build for a second validation process prior to completion of validation of the first build;
   staging the first and second validation process so that the first and second builds can be reverted independently of one another in response to a validation issue, wherein the staging comprises:
   reserving a percentage of production rings that are equally usable by each of the first build or second build;
   releasing the first build and the second build progressively through the production rings up to the reserved percentage of production rings;
   determining which of the first build or second build should proceed to a next validation stage of the first or second validation process; and
   independently completing the first and second validation process in the absence of a validation issue.

2. The method of claim 1, wherein the first and second builds are validated on a plurality of virtual machines, the method further comprising releasing the first and second builds to respective percentages of the virtual machines.

3. The method of claim 1, further comprising releasing the first and second builds in multiple stages.

4. The method of claim 1, wherein the first and second builds use independent sets of build variables.

5. The method of claim 1, wherein the first and second builds are validated on a plurality of virtual machines and the first and second builds are released in multiple stages, the method further comprising providing options to suspend rollout, resume rollout, and move to a next rollout stage.

6. The method of claim 1, wherein the first and second builds are validated on a plurality of virtual machines and the first and second builds are released in multiple stages, wherein a first release vehicle increases a percentage of virtual machines that have one particular variant.

7. The method of claim 1, further comprising:
   in response to a regression, triggering a workflow and stopping rollout of all variants.

8. The method of claim 7, further comprising in response to determining that the regression is a bug, triggering a fix for all variants to resume a release vehicle for the builds.

9. A system comprising:
   one or more processors; and
   a memory in communication with the one or more processors, the memory having computer-readable instructions stored thereupon that, when executed by the one or more processors, cause the system to perform operations comprising:
   identifying a set of code that is to be validated;
   determining a first configuration for the set of code that configures the code as a first build for validation;
   releasing the first build for a first validation process;
   prior to completion of validation of the first build, determining a second configuration for the set of code that configures the code as a second build for validation;
   releasing the second build for a second validation process prior to completion of validation of the first build;
   staging the first and second validation process so that the first and second builds can be reverted independently of one another in response to a validation issue, wherein the staging comprises:
   reserving a percentage of production rings that are equally usable by each of the first build or second build;
   releasing the first build and the second build progressively through the production rings up to the reserved percentage of production rings;
   determining which of the first build or second build should proceed to a next validation stage of the first or second validation process; and
   independently completing the first and second validation process in the absence of a validation issue.

10. The system of claim 9, further comprising executing a variant framework that includes one or more build-time variables.

11. The system of claim 9, further comprising reserving a percentage of production rings for use by all active variations.

12. The system of claim 9, further comprising pipelining to allow for parallel release vehicles.

13. The system of claim 9, wherein the first and second builds are validated on a plurality of virtual machines, further comprising releasing the first and second builds to respective percentages of the virtual machines.

14. The system of claim 9, further comprising releasing the first and second builds in multiple stages.

15. The system of claim 9, wherein the first and second builds use independent sets of build variables.

16. The system of claim 9, wherein the first and second builds are validated on a plurality of virtual machines and the first and second builds are released in multiple stages, further comprising providing options to suspend rollout, resume rollout, and move to a next rollout stage.

17. A computer-readable storage medium having computer-executable instructions stored thereupon which, when executed by one or more processors of a system, cause the system to:
   identifying a set of code that is to be validated;
   determining a first configuration for the set of code that configures the code as a first build for validation;
   releasing the first build for a first validation process;
   prior to completion of validation of the first build, determining a second configuration for the set of code that configures the code as a second build for validation;
   releasing the second build for a second validation process prior to completion of validation of the first build;
   staging the first and second validation process so that the first and second builds can be reverted independently of one another in response to a validation issue, wherein the staging comprises:
   reserving a percentage of production rings that are equally usable by each of the first build or second build;
   releasing the first build and the second build progressively through the production rings up to the reserved percentage of production rings;
   determining which of the first build or second build should proceed to a next validation stage of the first or second validation process; and
   independently completing the first and second validation process in the absence of a validation issue.

18. The computer-readable storage medium of claim 17, wherein the first and second builds are validated on a plurality of virtual machines, further comprising releasing the first and second builds to respective percentages of the virtual machines.

19. The computer-readable storage medium of claim 17, wherein the first and second builds are validated on a plurality of virtual machines and the first and second builds are released in multiple stages, further comprising providing options to suspend rollout, resume rollout, and move to a next rollout stage.

20. The computer-readable storage medium of claim 17, wherein the first and second builds are validated on a plurality of virtual machines and the first and second builds are released in multiple stages, wherein a first release vehicle increases a percentage of virtual machines that have one particular variant.

* * * * *